(12) United States Patent
von Meyerinck

(10) Patent No.: US 7,185,685 B2
(45) Date of Patent: Mar. 6, 2007

(54) HEAD PIECE FOR REFUELING SYSTEMS

(76) Inventor: Wolfgang von Meyerinck, Daubringer Strasse 43, Lollar (DE) D-35457

(*) Notice: Subject to any disclaimer, the term of this patent is extended or adjusted under 35 U.S.C. 154(b) by 145 days.

(21) Appl. No.: 11/009,654

(22) Filed: Dec. 10, 2004

(65) Prior Publication Data

US 2006/0054244 A1    Mar. 16, 2006

(30) Foreign Application Priority Data

Jul. 13, 2004   (EP) .................. 04016427

(51) Int. Cl.
B65B 1/04    (2006.01)
(52) U.S. Cl. ........................ 141/387
(58) Field of Classification Search ........... 141/387, 141/391, 98, 250, 279, 284
See application file for complete search history.

(56) References Cited

U.S. PATENT DOCUMENTS

| 3,176,730 A | * | 4/1965 | Knight ............... 141/290 |
| 3,651,832 A | | 3/1972 | Meyer |
| 3,753,453 A | * | 8/1973 | Madden et al. .......... 141/387 |
| 3,891,004 A | | 6/1975 | Knight |
| 4,658,874 A | | 4/1987 | von Meyerinck et al. |
| 4,993,463 A | | 2/1991 | von Meyerinck et al. |

FOREIGN PATENT DOCUMENTS

| DE | 3523472 | 8/1986 |
| EP | 0 166 800 | 1/1986 |
| EP | 0 394 543 A1 | 10/1990 |

* cited by examiner

Primary Examiner—Steven O. Douglas
(74) Attorney, Agent, or Firm—Fredrikson & Byron, PA

(57) ABSTRACT

The invention pertains to a head piece (01) with a refueling coupler (02) for being connected to a tank, wherein several rigid pipe sections (03, 04, 05, 06, 07, 08) are provided for conveying the fuel, wherein the pipe sections (03, 04, 05, 06, 07, 08) are connected by means of several swivel joints (09, 10, 11, 12, 13, 14) in order to realize an adjustable spatial arrangement of the refueling coupler (02), and wherein at least a first swivel joint (09) and a second swivel joint (10) can be respectively swiveled about a horizontal swiveling axis (25, 26) in order to adjust the height of the refueling coupler (02). A parallel lever drive (15) is provided on the head piece (01) in order to hold a first pipe section (03) in a certain angular position during the height adjustment of the refueling coupler (02).

26 Claims, 2 Drawing Sheets

HEAD PIECE FOR REFUELING SYSTEMS

CROSS REFERENCE TO RELATED APPLICATIONS

Figure 1:
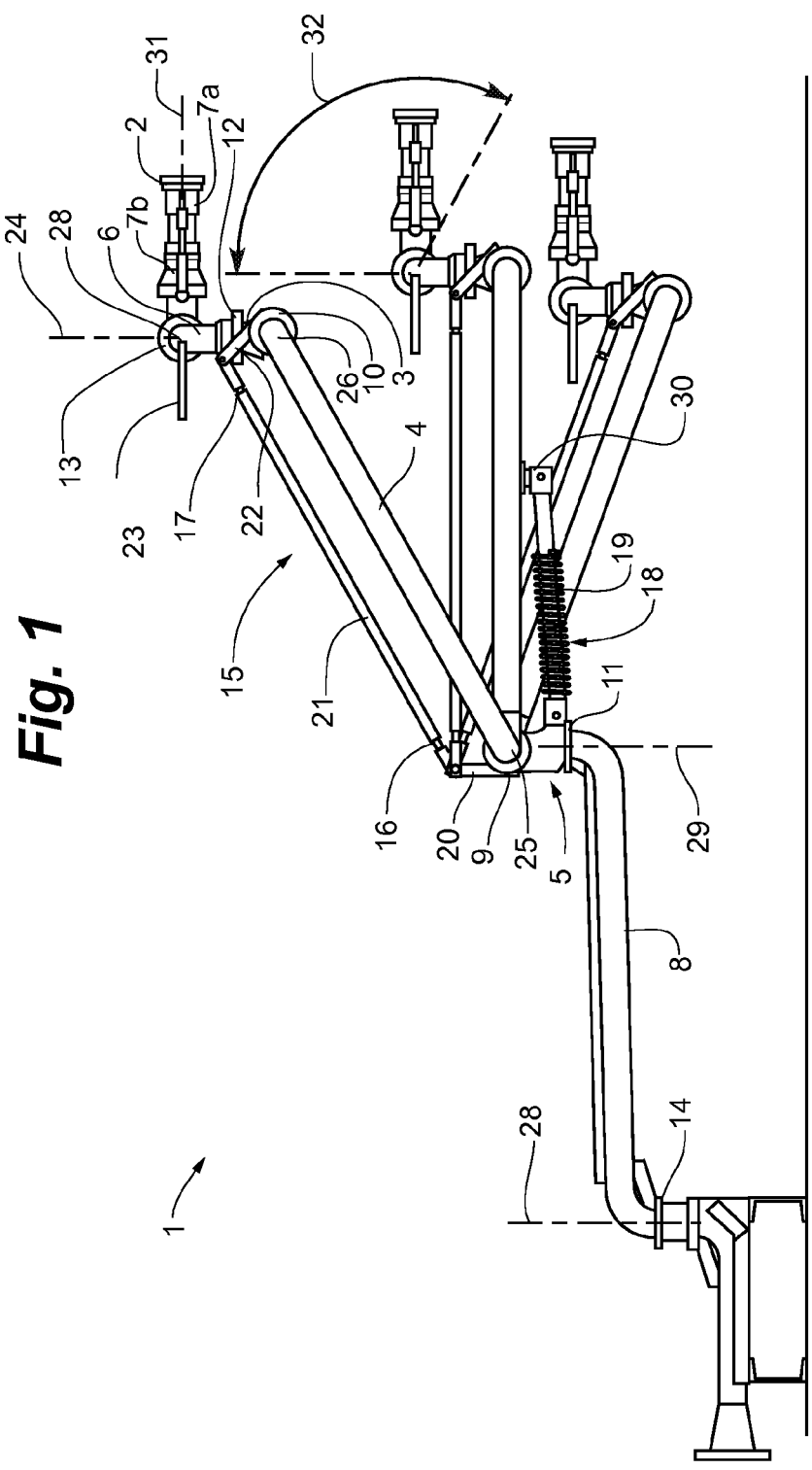

The present Application claims the benefit of European Patent Application number 04016427.9 filed on Jul. 13, 2004. The entire disclosure of the above-mentioned patent application is hereby incorporated by reference herein.

BACKGROUND OF THE INVENTION

The invention pertains to a head piece for mobile or stationary refueling systems that comprises a refueling coupler for being connected to a tank, wherein several rigid pipe sections are provided for conveying the fuel.

Head pieces of this type are used, for example, as refueling arms or loading arms in industrial plants, particularly in the chemical industry. Such head pieces are also used as refueling systems at airports, particularly for refueling military aircraft.

When loading fuel and other liquid chemical mediums into tank trucks, railroad tank cars, non-stationary containers or aircraft, large quantities of the medium need to be transferred from a stationary or mobile container system, storage tank or transfer station into the tank to be filled within a very short period of time. For example, loading or unloading arms that are stationarily connected to a pipeline delivering the medium are utilized for this purpose.

When refueling military or civil aircraft, for example, large quantities of fuel need to be transferred from a stationary fuel system, storage tank or hydrant system into the tank to be filled by means of mobile, non-stationary hose carts or by means of adjustable refueling arms. Known systems of this type consist of stationary, scissor-shaped refueling arms that are stationarily connected to a pipeline delivering the medium or of mobile refueling arms.

In addition, it would also be conceivable to utilize head pieces of this type on refueling vehicles that are used, for example, for refueling aircraft.

Head pieces known from the state of the art comprise hoses, the front end of which is provided with a refueling coupler such that the refueling process can take place immediately after said coupler is connected to the filling hole of the tank to be filled.

For example, EP 01 66 800 E1 discloses a head piece for mobile or stationary refueling systems that comprises a refueling coupler for being connected to the tank to be respectively filled or emptied, wherein the head piece consists of a pipeline that is composed of six pipe sections, and wherein said pipe sections are connected to one another by six swivel joints that respectively have one degree of freedom.

However, refueling systems known from the state of the art have the disadvantage that their handling is associated with significant difficulties. For example, hoses represent a significant safety risk due to their susceptibility and sensitivity to heat, particularly when they are used in the vicinity of hot turbines and engines or in the vicinity of running turbines, respectively. These disadvantages simultaneously require intensive maintenance and inspection activities that need to be carried out before, during and/or after each refueling process. In addition, rigid head pieces or refueling systems known from the state of the art have the significant disadvantage of being very complicated to handle, wherein the connection with the tank connection piece of the vehicle or aircraft to be refueled is very difficult to produce and requires a high expenditure of force.

Particular problems arise when the tank connection piece of wide-body aircraft is situated on the underside of the wings. In such instances, the refueling coupler needs to be aligned vertically upward before it can be connected to the tank connection piece of the aircraft.

Since head pieces of this type do not consist of hoses, but rather pipe sections and swivel joints provided between the pipe sections, the head piece may, if so required, also be equipped with wheels in order to realize a mobile system.

BRIEF SUMMARY OF THE INVENTION

The invention is based on the objective of developing a head piece that can be easily operated without any handling problems and connected to a connection piece without practically any moments, wherein said head piece only requires low maintenance expenditures, is suitable for loading as well as unloading processes and makes it possible to connect the head piece with an exceptionally low expenditure of force. Head pieces of this type can be utilized on stationary or mobile loading and/or unloading systems, particularly on refueling and/or defueling systems, for example, at airports.

This objective is attained with a head piece that is realized in accordance with embodiments of the invention as claimed herein.

Advantageous embodiments of the invention form the objects of the dependent claims.

The head piece conventionally comprises a refueling coupler for being connected to a tank, wherein several rigid pipe sections are provided for conveying the fuel, wherein the pipe sections are connected by means of several swivel joints in order to realize an adjustable spatial arrangement of the refueling coupler, and wherein at least a first swivel joint can be swiveled about a horizontal swiveling axis in order to adjust the height of the refueling coupler. The numbering used for the swivel joints and the pipe sections of the head piece according to the invention does not describe the sequence of the respective components on the head piece, but is merely intended to allow a definite association between the references provided and the components on the head piece.

According to the invention, the proposed head piece is characterized in that a parallel lever drive is provided on the head piece in order to hold a first pipe section in a certain angular position during the height adjustment of the refueling coupler. This parallel lever drive makes it possible, in particular, to hold a pipe section of the head piece in a certain angular position, particularly in a vertical position, during a height adjustment of the first pipe section. Consequently, the alignment of the refueling coupler relative to the tank connection piece of a vehicle or aircraft is significantly simplified.

According to one embodiment of the invention, an adjusting device is provided on the parallel lever drive in order to adjust the angular position of the first pipe section. This adjusting device makes it possible to subsequently correct or adapt the angular position of the first pipe section.

This adjusting device is formed by two opposite threads that make it possible to vary the length of one lever of the parallel lever drive.

The invention also proposes that the second swivel joint is arranged downstream of the first swivel joint referred to the refueling direction of the fuel.

In order to achieve a highly stable and safe design of the head piece, the first swivel joint and the second swivel joint are directly connected to one another by means of a second rigid pipe section.

In this case, the swivel joints are arranged in such a way that the horizontal swiveling axes of the first and the second swivel joint extend parallel to one another.

It is also proposed that the first swivel joint is connected to a directly adjacent third swivel joint by means of a third rigid pipe section, wherein the third swivel joint can be swiveled about a vertical swiveling axis.

In this case, the third swivel joint is arranged upstream of the first swivel joint referred to the refueling direction of the fuel.

The second swivel joint is connected to a directly adjacent fourth swivel joint by means of the first pipe section, wherein the fourth swivel joint can be swiveled about the center axis of the first pipe section that is held in a certain angular position by the parallel lever drive, particularly about a vertical swiveling axis.

The invention also proposes that the fourth swivel joint is arranged downstream of the second swivel joint referred to the refueling direction of the fuel.

The vertical swiveling axis of the third swivel joint and the vertical swiveling axis of the fourth swivel joint are arranged such that they extend parallel to one another.

In addition, the fourth swivel joint may be connected to a directly adjacent fifth swivel joint by means of a fourth rigid pipe section, wherein the fifth swivel joint can be swiveled about a horizontal swiveling axis.

In this case, the fifth swivel joint is connected to the refueling coupler by means of a fifth rigid pipe section.

The third swivel joint may be connected to a directly adjacent sixth swivel joint by means of a sixth rigid pipe section.

According to one preferred embodiment of the invention, a balancing device is provided on the head piece in order to counterbalance at least one pipe section and/or at least one swivel joint and/or the refueling coupler. Such a balancing device may consist, for example, of a hydraulic damper and makes it possible to align the head piece with a minimal expenditure of force, namely such that a connection between the refueling coupler and the tank connection piece of the vehicle or aircraft to be refueled can be comfortably and safely produced. The refueling coupler can be aligned at arbitrary connecting angles and in arbitrary connecting positions without exerting essentially any force.

The balancing device may be designed in such a way that it counterbalances the second rigid pipe section. The balancing device is also realized in such a way that it supports the second rigid pipe section relative to the third rigid pipe section.

According to another preferred embodiment of the invention, the balancing device consists of a prestressed spring assembly. Naturally, it would also be conceivable to realize the balancing device differently. However, the exact design of the balancing device is not important in the context of the invention. According to another particularly preferred embodiment of the invention, the prestress of the spring assembly is adjustable. This means that the balancing device can be adapted to other forces if different pipe sections or swivel joints are respectively added or removed.

The invention also proposes that the parallel lever drive is formed by the first rigid pipe section, the second rigid pipe section and three connecting levers, wherein the first connecting lever is rigidly mounted on the third pipe section in a vertically aligned position, wherein the second connecting lever is arranged parallel to the second rigid pipe section, wherein the third connecting lever is rigidly mounted on the first pipe section, and wherein the second connecting lever is connected in an articulated fashion to the first connecting lever and to the third connecting lever.

It is particularly advantageous if the fourth swivel joint is arranged directly above the sixth swivel joint, wherein the arrangement, in particular, of the fourth swivel joint above the sixth swivel joint should cause the vertical swiveling axis of the fourth swivel joint to be aligned with the vertical swiveling axis of the sixth swivel joint.

This is possible, in particular, if the horizontal distance between the vertical swiveling axis of the sixth swivel joint and the vertical swiveling axis of the third swivel joint essentially corresponds to the horizontal distance between the vertical swiveling axis of the third swivel joint and the vertical swiveling axis of the fourth swivel joint. A quite significant length adjustment of the head piece can be achieved due to this measure. If the fourth swivel joint is situated directly above the sixth swivel joint, the head piece is adjusted to its minimum length.

The maximum length of the head piece is reached when the second pipe section and the sixth pipe section are successively arranged in the horizontal direction.

BRIEF DESCRIPTION OF THE SEVERAL VIEWS OF THE DRAWING(S)

One embodiment of the invention is schematically illustrated in the figures and described in an exemplary fashion below.

Figure 2:
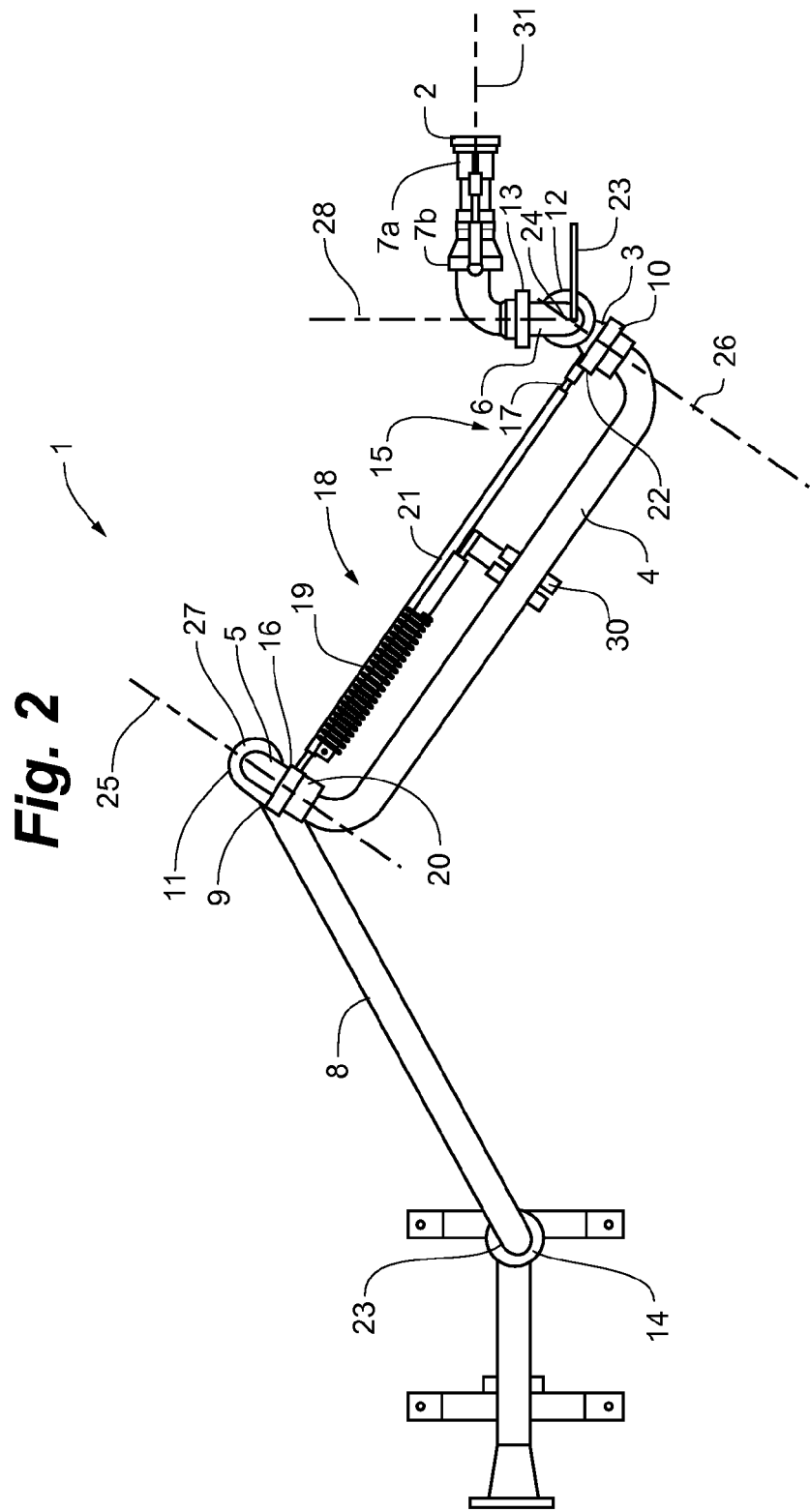

The figures show:

FIG. 1, a side view of a head piece of a refueling system that is realized in accordance with the invention, and FIG. 2, a top view of the head piece shown in FIG. 1.

DETAILED DESCRIPTION OF THE INVENTION

The head piece 01 shown in FIG. 1 consists of several swivel joints 09, 10, 11, 12, 13, 14 and several pipe sections 03, 04, 05, 06, 07 and 08 that are connected to the swivel joints. The fifth rigid pipe section 07 connects the fifth swivel joint 13 to a downstream refueling coupler 02. The fifth rigid pipe section 07 is also provided with a handle piece 23 that serves for maneuvering the head piece 01 and the refueling coupler 02, respectively.

The swivel joints 09, 10, 11, 12, 13 and 14 arranged on the head piece 01 make it possible to freely adjust and align the head piece 01, particularly the distance, the height and the angle of the refueling coupler 02. A balancing device 18 is provided on the head piece 01 in order to ensure a very exact adjustment of the head piece 01 and to simplify the insertion of the refueling coupler 02 into the tank of the vehicle or aircraft, respectively. This balancing device 18 essentially consists of a prestressed spring assembly 19 that can be adjusted by means of an adjusting device 30. The prestress of the spring assembly 19 can be adjusted by means of the adjusting device 30 in such a way the prestress of the spring assembly 19 counterbalances the weight of the rigid pipe sections 03, 04, 06, 07, the refueling coupler 02 and the swivel joints 10, 12 and 13. This counterbalancing makes it possible for only one person to easily connect the refueling coupler 02 to the corresponding tank connection piece.

A parallel lever drive 15 is provided on the head piece 01 in order to connect and align the refueling coupler 02 of the head piece 01 relative to the tank connection piece of the vehicle or aircraft with the least expenditure of force. This parallel lever drive 15 causes the pipe section 03 to always be held in a vertically upward directed position during a vertical adjustment of the refueling coupler 02 independently of the height, at which the tank connection piece is positioned. The parallel lever drive 15 is essentially formed by the first rigid pipe section 03, the second rigid pipe section 04 and three connecting levers 20, 21 and 22. The parallel lever drive 15 is also provided with an adjusting device that is formed by two opposite threads 16 and 17. These opposite threads make it possible to vary the length of one lever, particularly the connecting lever 21.

The first connecting lever 20 is rigidly mounted on the third pipe section 05 in a vertically aligned position. The second connecting lever 21 is arranged essentially parallel to the second rigid pipe section 04. The third connecting lever 22 is rigidly mounted on the first pipe section 03, wherein the second connecting lever 21 is connected in an articulated fashion to the first connecting lever 20 and the third connecting lever 22.

Due to the design of the parallel lever drive 15 in connection with the two swivel joints 09 and 10 that can be swiveled horizontally, the head piece 01 or the refueling coupler 02, respectively, can be easily adjusted with respect to its [text missing] without having to exert a significant force. It is also ensured that the refueling coupler 02 can be easily aligned relative to the tank connection piece and connected thereto at any height. After the refueling coupler 02 is moved into the vicinity of the tank connection piece, the angle of the refueling coupler 02 can be adjusted by swiveling the swivel joint 13 within the swiveling range 32 in order to connect the refueling coupler to the tank connection piece. For example, the refueling coupler 02 is swiveled vertically upward if the tank connection piece is positioned on the underside of the wings.

The connecting angle of the refueling coupler 02 can be adjusted by turning the front part 07a of the fifth pipe section 07 relative to the rear part 07b, for example, in order to interlock the refueling coupler 02 with the tank connection piece.

The length of the head piece 01 can be minimized by arranging the joint 12 directly above the joint 14. In this case, the vertical swiveling axes 24 and 29 can be aligned with one another.

Since the head piece 01 essentially consists of pipe sections, it is equally well suited for refueling and defueling processes. The refueling coupler 02 can be freely aligned due to the large number of swivel joints.

Another advantage of the lengths of pipe or pipe sections, respectively, can be seen in the fact that the individual pipe sections can be adapted to the required refueling rate. This means that very short refueling times can be ensured.

The utilization of a balancing unit 18 in connection with the parallel lever drive 15 on the head piece 01 allows a simple and effortless one-man operation because the horizontal axis 28 is always held in the adjusted position, namely even if the refueling coupler 02 is vertically adjusted.

LIST OF REFERENCE SYMBOLS

01 Head piece
02 Refueling coupler
03 First rigid pipe section
04 Second rigid pipe section
05 Third rigid pipe section
06 Fourth rigid pipe section
07 Fifth pipe section
08 Sixth rigid pipe section
09 First swivel joint
10 Second swivel joint
11 Third swivel joint
12 Fourth swivel joint
13 Fifth swivel joint
14 Sixth swivel joint
15 Parallel lever drive
16 Thread
17 Thread
18 Balancing device
19 Spring assembly
20 First connecting lever
21 Second connecting lever
22 Third connecting lever
23 Handle piece
24 Vertical swiveling axis
25 Horizontal swiveling axis
26 Horizontal swiveling axis
27 Vertical swiveling axis
28 Horizontal swiveling axis
29 Vertical swiveling axis
30 Adjusting device
31 Longitudinal axis
32 Swiveling range

What is claimed is:

1. A head piece (01) with a refueling coupler (02) for being connected to a tank, wherein several rigid pipe sections (03, 04, 05, 06, 07, 08) are provided for conveying the fuel, wherein the pipe sections (03, 04, 05, 06, 07, 08) are connected by means of several swivel joints (09, 10, 11, 12, 13, 14) in order to realize an adjustable spatial arrangement of the refueling coupler (02), and wherein at least a first swivel joint (09) and a second swivel joint (10) can be respectively swiveled about a horizontal swiveling axis (25, 26) in order to adjust the height of the refueling coupler (02), characterized in that a parallel lever drive (15) is provided on the head piece (01) in order to hold a first pipe section (03) in a certain angular position during the height adjustment of the refueling coupler (02).

2. The head piece according to claim 1,
characterized in
that the first pipe section (03) is held in an approximately vertical position.

3. The head piece according to claim 1,
characterized in
that the parallel lever drive (15) is provided with an adjusting device for adjusting the angular position of the first pipe section (03).

4. The head piece according to claim 3,
characterized in
that the adjusting device is formed by two opposite threads (16, 17) that make it possible to vary the length of one lever (21) of the parallel lever drive (15).

5. The head piece according to claim 1,
characterized in
that the second swivel joint (10) is arranged downstream of the first swivel joint (09) referred to the refueling direction of the fuel.

6. The head piece according to claim 1,
characterized in
that the first swivel joint (09) and the second swivel joint (10) are directly connected to one another by means of a second rigid pipe section (04).

7. The head piece according to claim 1,
characterized in that the horizontal swiveling axes (25, 26) of the first (09) and the second swivel joint (10) extend parallel to one another.

8. The head piece according to claim 1, characterized in
that the first swivel joint (09) is connected to a directly adjacent third swivel joint (11) by means of a third rigid pipe section (05), wherein the third swivel joint (11) can be swiveled about a vertical swiveling axis (27).

9. The head piece according to claim 8, characterized in
that the third swivel joint (11) is arranged upstream of the first swivel joint (09) referred to the refueling direction of the fuel.

10. The head piece according to claim 8, characterized in
that the second swivel joint (10) is connected to a directly adjacent fourth swivel joint (12) by means of the first pipe section (03), wherein the fourth swivel joint (12) can be swiveled about the center axis of the first pipe section (03) that is held in a certain angular position by the parallel lever drive (15), particularly about a vertical swiveling axis (24).

11. The head piece according to claim 10, characterized in
that the fourth swivel joint (12) is arranged downstream of the second swivel joint (10) referred to the refueling direction of the fuel.

12. The head piece according to claim 10, characterized in
that the vertical swiveling axis (27) of the third swivel joint (11) extends parallel to the vertical swiveling axis (24) of the fourth swivel joint (12).

13. The head piece according to claim 10, characterized in
that the fourth swivel joint (12) is connected to a directly adjacent fifth swivel joint (13) by means of a fourth rigid pipe section (06), wherein the fifth swivel joint (13) can be swiveled about a horizontal swiveling axis (28).

14. The head piece according to claim 13, characterized in
that the fifth swivel joint (13) is connected to the refueling coupler (02) by means of a fifth pipe section (07).

15. The head piece according to claim 14, characterized in
that the fifth pipe section (07) consists of two parts, wherein the part (07a) of the fifth pipe section (07) that carries the refueling coupler (02) can be turned relative to the other part (07b) of the fifth pipe section (07) about the longitudinal axis (31) of the fifth pipe section (07).

16. The head piece according to claim 8, characterized in
that the third swivel joint (11) is connected to a directly adjacent sixth swivel joint (14) by means of a sixth rigid pipe section (08).

17. The head piece according to claim 8, characterized in
that the vertical swiveling axis (27) of the third swivel joint (11) extends parallel to the vertical swiveling axis (29) of the sixth swivel joint (14).

18. The head piece according to claim 8, characterized in
that the head piece (01) is provided with a balancing device (18) for counter-balancing at least one pipe section (03, 04, 06, 07) and/or at least one swivel joint (10, 12, 13) and/or the refueling coupler (02).

19. The head piece according to claim 18, characterized in
that the balancing device (18) counterbalances the second rigid pipe section (04).

20. The head piece according to claim 18, characterized in
that the balancing device (18) supports the second rigid pipe section (04) relative to the third rigid pipe section (05).

21. The head piece according to claim 18, characterized in
that the balancing device (18) contains a prestressed spring assembly (19).

22. The head piece according to claim 21, characterized in
that the prestress of the spring assembly (19) is adjustable.

23. The head piece according to claim 8, characterized in
that the parallel lever drive (15) is formed by the first rigid pipe section (03), the second rigid pipe section (04) and three connecting levers (20, 21, 22), wherein the first connecting lever (20) is rigidly mounted on the third pipe section (05), particularly in a vertically aligned position, wherein the second connecting lever (21) is arranged parallel to the second rigid pipe section (04), wherein the third connecting lever (22) is rigidly mounted on the first pipe section (03), and wherein the second connecting lever (21) is connected in an articulated fashion to the first connecting lever (20) and the third connecting lever (22).

24. The head piece according to claim 16, characterized in
that the fourth swivel joint (12) is arranged directly above the sixth swivel joint (14).

25. The head piece according to claim 24, characterized in
that the vertical swiveling axis (24) of the fourth swivel joint (12) is aligned with the vertical swiveling axis (29) of the sixth swivel joint (14) if the fourth swivel joint (12) is arranged above the sixth swivel joint (14).

26. The head piece according to claim 16, characterized in
that the horizontal distance between the vertical swiveling axis (29) of the sixth swivel joint (14) and the vertical swiveling axis (27) of the third swivel joint (11) essentially corresponds to the horizontal distance between the vertical swiveling axis (24) of the fourth swivel joint (12) and the vertical swiveling axis (27) of the third swivel joint (11).

* * * * *